United States Patent
Petkov

(10) Patent No.: US 12,475,633 B2
(45) Date of Patent: Nov. 18, 2025

(54) TECHNIQUE FOR REAL-TIME RENDERING OF MEDICAL IMAGES USING VIRTUAL SPHERICAL LIGHT SOURCES

(71) Applicant: SIEMENS HEALTHINEERS AG, Forchheim (DE)

(72) Inventor: Kaloian Petkov, Lawrenceville, NJ (US)

(73) Assignee: Siemens Healthineers AG, Forchheim (DE)

( * ) Notice: Subject to any disclaimer, the term of this patent is extended or adjusted under 35 U.S.C. 154(b) by 211 days.

(21) Appl. No.: 18/296,387

(22) Filed: Apr. 6, 2023

(65) Prior Publication Data
US 2023/0360314 A1    Nov. 9, 2023

(30) Foreign Application Priority Data
May 6, 2022    (EP) .................................... 22171985

(51) Int. Cl.
*G06T 15/08* (2011.01)
*G06T 15/06* (2011.01)
*G06T 15/50* (2011.01)

(52) U.S. Cl.
CPC .............. *G06T 15/08* (2013.01); *G06T 15/06* (2013.01); *G06T 15/506* (2013.01); *G06T 2210/41* (2013.01)

(58) Field of Classification Search
CPC ......... G06T 15/06; G06T 15/08; G06T 15/50; G06T 15/506; G06T 2210/41
See application file for complete search history.

(56) References Cited

U.S. PATENT DOCUMENTS

| | | | |
|---|---|---|---|
| 8,884,959 B2 | 11/2014 | Desgranges et al. | |
| 2004/0233193 A1* | 11/2004 | Margadant | G06T 15/506 345/419 |
| 2014/0232719 A1 | 8/2014 | Wahrenberg | |
| 2019/0221027 A1 | 7/2019 | Petkov | |
| 2022/0005252 A1* | 1/2022 | Breivik | A61B 8/465 |

FOREIGN PATENT DOCUMENTS

JP    2020201941 A  * 12/2020    ........... G06T 11/005

OTHER PUBLICATIONS

Engel, Klaus, et al. "Real-time vol. graphics." ACM Siggraph 2004 Course Notes. 2004. (Year: 2004).*

(Continued)

*Primary Examiner* — Ryan McCulley

(57) ABSTRACT

For real-time rendering of medical images from volumetric data obtained from a medical scanner, one or more optical properties of the received volumetric data are determined. A light volume associated to a spherical light source is constructed. The light volume comprises a series of consecutive spherical slices through which light propagates while determining a fraction of the light propagating from one spherical slice to a neighboring spherical slice depending on the optical properties. The constructed light volume is sampling with a gradient-free shading that depends on the determined optical properties. At least one medical image is rendered in relation to the received volumetric data based on the sampled light volume.

20 Claims, 7 Drawing Sheets

(56) References Cited

OTHER PUBLICATIONS

LaMar, Eric, Bernd Hamann, and Kenneth I. Joy. Multiresolution techniques for interactive texture-based volume visualization. IEEE, 1999. (Year: 1999).*
Machine translation of JP 2020-201941 (Year: 2020).*
T. Ropinski, C. Döring and C. Rezk-Salama, "Interactive Volumetric Lighting Simulating Scattering and Shadowing," in IEEE Pacific Visualization Symposium (PacificVis), 2010.
D. Jonsson, E. Sundén, A. Ynnerman and T. Ropinski, "A Survey of Volumetric Illumination Techniques," Computer Graphics Forum, vol. 33, No. 1, pp. 27-51, 2014.
E. Dappa, K. Higashigaito, J. Fornaro, S. Leschka, S. Wildermuth and H. Alkadhi, "Cinematic rendering—an alternative to volume rendering for 3D computed tomography imaging," Insights into Imaging, vol. 7, No. 6, pp. 849-856, 2016.
T. Kroes, "Exposure Render: An Interactive Photo-Realistic Volume Rendering Framework," PLoS One, vol. 8, No. 4, 2012.
C. R. Alla Chaitanya, A. Kaplanyan, C. Schied, M. Salvi, A. Lefohn, D. Nowrouzezahrai and T. Aila, "Interactive Reconstruction of Monte Carlo Image Sequences using a Recurrent Denoising Autoencoder," ACM Transactions on Graphics, vol. 36, No. 4, pp. 98:1-98:12, 2017.
T. Müller, B. McWilliams, F. Rousselle, M. Gross and J. Novak, "Neural Importance Sampling," ACM Transactions on Graphics, vol. 38, No. 5, pp. 145:1-145:19, 2019.
J. Kniss, S. Premoze, C. Hansen, p. Shirley and A. McPherson, "A Model for Volume Lighting and Modeling," IEEE Transactions on Visualization and Computer Graphics, vol. 9, No. 2, pp. 150-162, 2003.
Ament Marco, et al., "Ambient Volume Scattering," IEEE Transactions on Visualization and Computer Graphics, vol. 19, No. 12, Dec. 1, 2013, pp. 2936-2945.
Y. Zhang, Z. Dong and K.-L. Ma, "Real-Time Volume Rendering in Dynamic Lighting Environments Using Precomputed Photon Mapping," IEEE Transactions on Visualization and Computer Graphics, vol. 19, No. 8, pp. 1317-1330, 2013.
R. Geist and J. Westall, "Lattice-Boltzmann Lighting Models," in GPU Computing Gems Emerald Edition, 2012.
Y. Zhang and Y. Zhang, "Fast global illumination for interactive volume visualization," in I3D '13 Proceedings of the ACM Siggraph Symposium on Interactive 3D Graphics and Games, 2013.
Extended European Search Report (EESR) mailed Nov. 14, 2022 in corresponding European Patent Application No. 22171985.9.
Blythe, D. et al; "Advanced Graphics Programming Techniques Using OpenGL"; in Siggraph 99 Course; pp. 1-2; 1999.

* cited by examiner

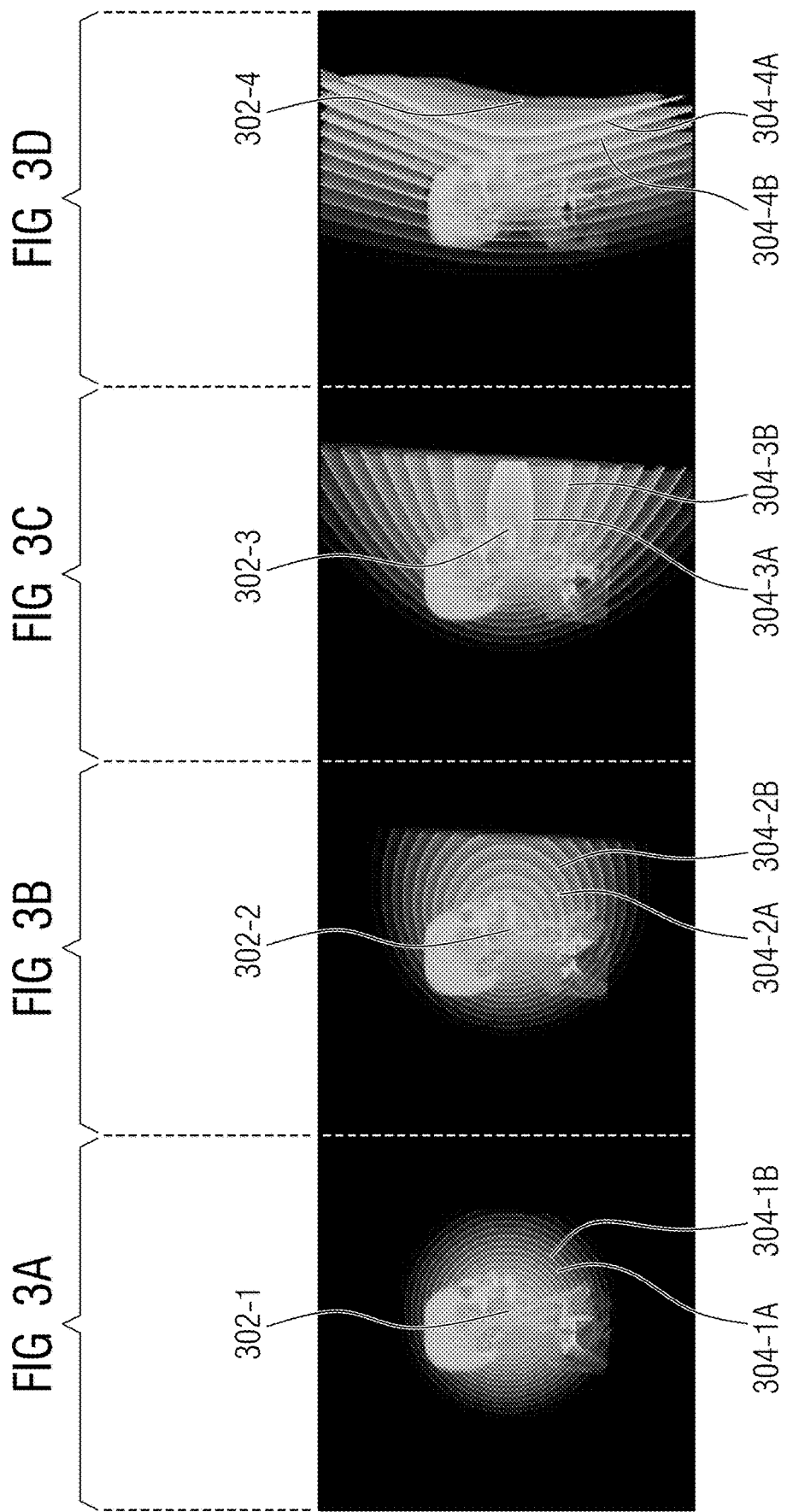

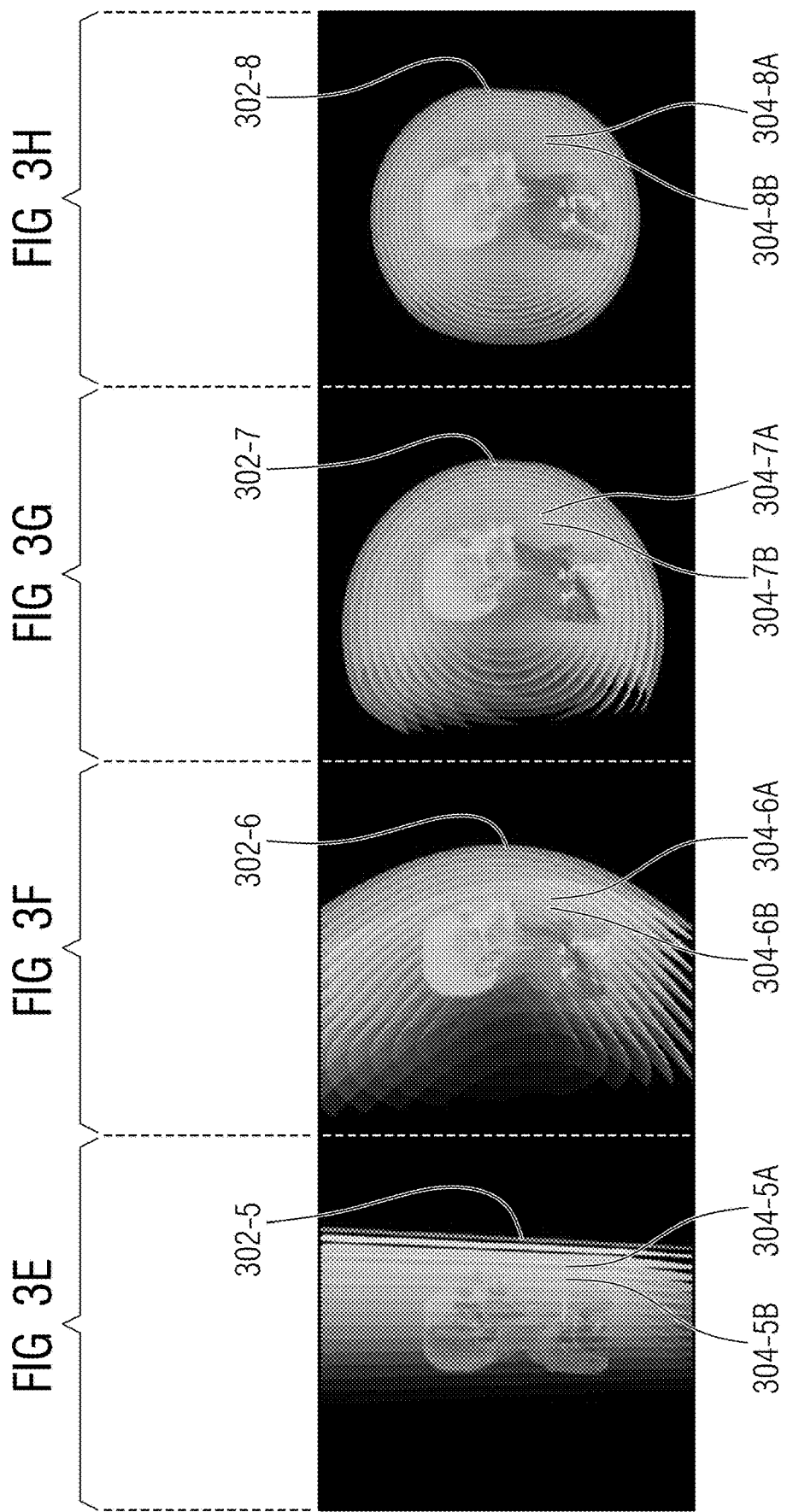

TECHNIQUE FOR REAL-TIME RENDERING OF MEDICAL IMAGES USING VIRTUAL SPHERICAL LIGHT SOURCES

RELATED APPLICATION

This application claims the benefit of EP 22171985.9, filed May 6, 2022, which is hereby incorporated by reference in its entirety.

FIELD

A technique for real-time rendering of medical images from volumetric data obtained from a medical scanner is provided. In particular, a method, a computing device, a system including the computing device and the medical scanner, a computer program product, and a non-transitory computer-readable medium are provided.

BACKGROUND

Volume rendering spans a wide variety of algorithms, which support different visual effects and may pose different computational challenges.

Two classes of algorithms are distinguished: local illumination and global illumination.

In local illumination algorithms, the shading at each voxel considers only the optical properties at that voxel (i.e., neighboring voxels are not taken into account). Phong shading (also denoted as Phong interpolation or normal-vector interpolation shading) or similar shading may be used to simulate various lighting conditions.

In global illumination algorithms, more realistic lighting is added to 3D scenes. Such algorithms take into account not only the light that comes directly from a light source (direct illumination), but also subsequent cases in which light rays from the same source are reflected by other surfaces in the scene, whether reflective or not (indirect illumination). In global illumination algorithms, lighting simulation is used to enable photorealistic effects, e.g., shadows, reflection, refraction, color bleeding, light scattering, and/or caustics.

Conventional volume visualization methods based on raycasting, which are still used in many current advanced visualization medical products, simulate only the emission and absorption of radiant energy along the primary viewing rays through the volumetric data. The emitted radiant energy at each point is absorbed according to the Beer-Lambert law along the ray to the observer location with absorption coefficients derived from the patient data. Renderers typically compute shading using only the standard local shading models at each point along the ray (e.g., the Blinn-Phong model), based on local volume gradients (i.e., local illumination). While fast, these methods do not simulate the complex light scattering and extinction associated with photorealism (i.e., global illumination).

Monte Carlo path tracing is a global illumination algorithm, which solves the rendering equation using Monte Carlo integration. It can produce highly realistic images, including for medical visualization. At the same time, the computational requirements are very high since hundreds to thousands of discrete light paths need to be simulated at each pixel or voxel. As more and more paths are simulated, the solution converges on an accurate estimation of the irradiance at each point for incoming light from all directions. The renderer employs a hybrid of volumetric scattering and surface-like scattering, modeled by phase functions and bidirectional reflectance distribution functions (BRDFs), respectively, based on properties derived from the anatomical data. Producing a single image may take of the order of minutes and is thus currently not suitable for real-time rendering. A variety of algorithms aim at addressing the performance challenges, including irradiance caching, which requires a long pre-computation on lighting changes before real-time rendering is possible, and artificial intelligence (AI)-based denoising and light path generation. However, real-time rendering still remains unachievable with conventional Monte Carlo path tracing.

At the other end of the global illumination spectrum are real-time rendering techniques that support a subset of the global illumination effects. Half-angle slicing simulates light propagation for a directional light source along consecutive slices along the light direction. At each lighting slice, the volume opacity attenuates the incoming light from the previous slice, and this process is executed in lockstep (i.e., by running the same set of operations at the same time in parallel) with slice-based volume rendering, which composites slices aligned along the half-angle between the viewing direction and the light source direction. The technique supports hard and/or soft shadows and forward-only light scattering at real-time rates.

Compared to half-angle slicing, interactive volume lighting (IVL) computes the entire lighting volume first, which allows similar visual effects to be achieved with raycasting algorithms for volume rendering, although at increased memory consumption. When the optical properties of the volumetric data interpretation (e.g., volume opacity and classification) and the position of the light source relative to the volumetric data remain static, the computed light volume can be reused for very high rendering performance, e.g., during camera movement, for stereoscopic rendering, virtual and/or augmented reality rendering, and/or rendering on power-efficient devices. Exterior point-like light sources are supported by having a lighting volume aligned to the anatomy volume and propagating the lighting along the two directions closest to the lighting direction.

Photon mapping techniques provide an alternative way to implement interior lighting and/or transillumination for volume rendering applications. In a first pass, photons are emitted from light sources, traced through the scene with scattering and absorption defined based on the optical properties of materials in the scene, and intersections with the scene are recorded in a photon map. In the rendering pass, the photon map is queried to approximate the indirect illumination. A real-time global illumination system may be based on volumetric photon mapping, with the limitation that lighting pre-computations are on the order of minutes, and interior light sources are not supported. A photon mapping-based system may be used for transillumination rendering of cardiac data using a low-resolution volumetric photon map computed on a central processing unit (CPU), which allows anatomy voxels to act as interior light sources. Photon-mapping thus suffers from a trade-off between long computational times and acceptable resolution for rendering.

The Lattice-Boltzmann method, a convection-diffusion numerical solver, or other methods may also be used to compute the light volume, with similar limitations as the photon mapping methods, e.g., in view of computational speed and resolution.

SUMMARY AND DESCRIPTION

It is therefore an object to provide a solution for real-time rendering of medical images from volumetric data. Alternatively, or in addition, an object is to reduce a computational cost in terms of time, processing, and/or memory for converting volumetric data from a medical scanner into medical images for rendering, in particular at real-time.

This object is solved by a computer implemented method for real-time rendering of medical images from volumetric data obtained from a medical scanner (which may also be denoted as medical imaging device or medical image scanner), by a computing device, by a system including the medical scanner and the computing device, by a computer program and/or computer program product, and by a non-transitory computer-readable medium.

Advantageous aspects, features and embodiments are described in the following description together with advantages.

In the following, the solution is described with respect to the method for real-time rendering of medical images from volumetric data obtained from a medical scanner as well as with respect to the computing device and system including the computing device. Features, advantages, and/or alternative embodiments herein can be assigned to the other aspects (e.g., the computer program or a computer program product) and vice versa. In other words, the computing device and/or for the system can be improved with features described in the context of the method. In this case, the functional features of the method are embodied by structural units of the computing device and/or of the system and vice versa, respectively.

As to a first aspect, a computer implemented method for real-time rendering of medical images from volumetric data obtained from a medical scanner is provided. The method includes an act of receiving volumetric data from the medical scanner. The method further includes an act of determining at least one optical property in relation to the received volumetric data. The method further includes an act of constructing a light volume associated to a (e.g., virtual) spherical light source. The light volume includes a series of consecutive spherical slices through which light from the spherical light source propagates according to the consecutive order (e.g., outwards). Constructing the light volume includes determining a fraction of the light propagating from one spherical slice to a corresponding neighboring spherical slice (e.g., the next bigger slide) according to the consecutive order. The propagating of the light depends on the determined at least one optical property (e.g., including an opacity, color, reflectance, and/or value indicative of chromatic scattering) in relation to the received volumetric data associated with the spherical slice.

The method further includes an act of sampling the constructed light volume. The sampling includes a (e.g., gradient-free) shading that depends on the determined at least one optical property in relation to the received volumetric data associated with the spherical slice.

The method still further includes an act of rendering at least one medical image in relation to the received volumetric data. The rendering is based on the sampled light volume.

The technique for real-time rendering may be applied to direct volume rendering (DVR). DVR includes a rendering technique that visualizes volumetric data (e.g., directly) from a voxel representation.

A voxel may represent a value of a (e.g., regular) three-dimensional (3D) grid.

DVR may dispense with further (e.g., intermediary) representations, thereby saving on computational costs and memory. A further (e.g., intermediary) representation may, e.g., be included in isosurface rendering, in which primitives (e.g., isosurfaces) are derived from the volumetric data and then visualized.

The volumetric data may relate to (e.g., anatomical) structures of a (e.g., human) body and/or patient. The structures may include hard tissue, e.g., bone structures, and/or soft tissue, e.g., internal organs and/or skin. The volumetric data may also be denoted as anatomical volumetric data.

The volumetric data may include a series of data sets acquired over a timescale specific to the medical scanner, which may include, e.g., an ultrasound (US) device, or a device for positron emission tomography (PET), for computed tomography (CT), and/or for magnetic resonance tomography (MRT). For example, a data set may correspond to a momentary and/or instantaneous state of the body and/or patient.

The at least one optical property may include an opacity, a reflectance, a color and/or a series of values related to chromatic scattering (also denoted as chromatic scattering indices) in relation to the received volumetric data. E.g., an internal organ (for example a liver and/or kidney) may be of a known tissue type, which may correspond to an opacity of the organ tissue, to a color of the organ tissue and/or to a reflectance of the (e.g., surface of the) organ tissue.

Determining the at least one optical property may include performing a classification. The classification may include a mapping of a scalar value received from the medical scanner. The scalar value may be a quantitative value, e.g., on the so-called Hounsfield scale. The Hounsfield scale includes a quantitative scale for describing radiodensity (e.g., of the received volumetric data). In the context of the medical scanner being a device for CT, the scalar value may also be denoted as CT number.

Alternatively, or in addition, a scattering rate of light might be dependent on the color of the light, which may be denoted as chromatic scattering.

The at least one optical property may vary over the volumetric data as the structures vary. E.g., the volumetric data may include (at least parts of) more than one internal organ and/or bone structure.

The classification of the at least one optical property may include a type of tissue.

The color, reflectance, opacity and/or chromatic scattering may be determined based on the classification, e.g., by using a look-up table (LUT).

The spherical light source may be configured to cast rays of light pointing radially outwards. Alternatively, the spherical light source may be configured to cast rays of light pointing radially inwards, e.g., towards the center of the sphere associated to the spherical light source.

The spherical light source may be a point-like light source. Alternatively, or in addition, the spherical slices may be concentric with respect to a center of the spherical light source.

The light volume may also be denoted as illumination volume, light space, and/or (e.g., light) propagation space.

The light volume may include a grid of voxels. Alternatively, or in addition, the light volume may store an amount of light that reaches a point in the volumetric data.

A mapping between a location of a voxel (also denoted as voxel location) in memory and the corresponding three-dimensional (3D) position in the volumetric data may use a linear, radial, and/or any further type of function.

The light volume in IVL is conventionally organized into one or more planar slices oriented along the z-axis of a three-dimensional Cartesian coordinate system, where light propagation is performed slice by slice in a front-to-back order from an exterior point-like light source, and the resulting illumination values are used for volume rendering (e.g., in the act of sampling the light volume) to determine (e.g., compute) global illumination effects.

According to one concept, the conventional parallel light propagation along the z-axis is replaced by light propagating radially (e.g., outwards) from a spherical light source using a series of consecutive spherical slices.

The series of consecutive spherical slices may also be denoted as spherical texture slicing. Alternatively, or in addition, the series of consecutive spherical slices may be included in a spherical grid.

The spherical geometry including the light source and the series of consecutive slices may be parameterized by polar coordinates (also denoted as spherical coordinates). The polar coordinates may include a radius (e.g., parameterizing the distance from a point-like light source or from the center of a spherical light source), and two angles. Each spherical slice may correspond to a fixed value of the radius.

The propagating (also: the propagation) of the light may be constructed from one spherical slice (e.g., outwards) to the neighboring spherical slice in forward light direction, e.g., for a spherical light source casting radial rays of light towards infinity.

The propagation of light along the spherical slices may result in the construction of the light volume.

By using the information stored in the light volume, in the act of sampling, global illumination effects may be determined.

Sampling may refer to the process of determining a (e.g., scalar) value stored at a predetermined position contained within the volumetric data from nearby voxel grid values and/or neighboring slices.

According to one technique, a "local sampling" on the light volume may be performed once the light propagation has been computed (and/or constructed), e.g., sampling a single location of the light volume during shading. Thereby, "global illumination shading" may be achieved as opposed to "local shading".

Two-dimensional (2D) and/or three-dimensional (3D) filters may be applied, e.g., bilinear and/or trilinear filters, respectively, and/or any higher-order filters such as a cubic filter and/or a B-spline (also denoted as basis-spline) filter, which may use a larger neighborhood of voxels than the bilinear and/or trilinear filters. The B-spline filter may have minimal support with respect to a given degree, smoothness and/or domain partition, e.g., in relation to the nearby voxel grid values.

According to one technique, domain-specific filtering of the light volume data may be implemented during and/or for the rendering. The domain-specific filtering may include a two-dimensional (2D) filtering in a plane orthogonal to a volume data gradient, and/or to a combination of directions, e.g., including a data gradient and/or a light direction. The domain-specific filtering may include a rotated-grid stratified sampling for the 2D filtering, where the grid is rotated for each invocation of the filtering operation, e.g., randomly at each step during raycasting and/or for each ray. This reduces the perceived visible artifacts.

A different set of filters and/or filtering parameters may be applied when constructing the light volume, and/or when sampling the illumination at the previous slice.

Alternatively, or in addition, sampling may include assigning (e.g., different) numbers of bits to different color samples per pixel and/or voxel. The color samples may be included in a red-green-blue (RGB) color space and/or an RGB-alpha (RGBA) color space. Alpha may refer to an opacity (or its inverse, i.e., transparency) at a pixel and/or voxel.

Global illumination effects may include hard shadows, soft shadows, forward light scattering, volumetric scattering (e.g., encoded in a phase function), surface-like scattering and/or reflection (e.g., encoded in a bidirectional reflectance distribution function, BRDF), refraction, color bleeding, absorption and/or caustics.

Any scattering may be chromatic, i.e., may depend on the wavelength of the incoming light originating from the spherical light source. E.g., a chromatic scattering term stored in the light volume may be used as a soft shadow term during shading.

Local and global illumination effects may include ambient occlusion (AO).

Shadowing may be due to light occlusion by one or more (e.g., anatomical) structures.

The (e.g., gradient-free) shading may include a graphical representation of depth perception of three-dimensional data (e.g., the volumetric data received from the medical scanner) by varying a level of darkness (or its inverse, i.e., lightness), a gray-scale and/or colors. The sampling and/or the shading may include a shadowing term which modulates direct illumination, e.g., as a multiplicative factor. The multiplicative factor may be applied (e.g., locally) to the light volume.

By the at least one optical property, e.g., including an opacity of the volumetric data, the incoming light may be attenuated from one spherical slice to the neighboring spherical slice (e.g., outwards in consecutive order viewed from the center of the spherical light source).

Any one of the (e.g., global) illumination effects, e.g., scattering and/or absorption of light, may depend on the at least one optical property.

Global illumination may alternatively, or in addition, be encoded by so-called irradiance caching. Irradiance caching may include ray tracing, e.g., in relation to diffuse surfaces. Alternatively, or in addition, irradiance caching may generalize the concept of the light volume (also denoted as illumination volume) by taking into account environmental light sources and/or multiple scattering of light.

The sampling may include a (e.g., Gaussian) kernel and/or a filter (also denoted as reconstruction filter). The (e.g., Gaussian) kernel and/or filter may encode forward light scattering and soft shadows. Alternatively, or in addition, the (e.g., Gaussian) kernel and/or filter may include a Gaussian distribution of samples on a two-dimensional disc oriented along a light propagation direction, and/or a three-dimensional sphere oriented along a group of light propagation directions.

Propagating light from one Cartesian slice (also denoted as planar slice) to a neighboring Cartesian slice is known as (e.g., conventional) interactive volume lighting (IVL). Alternatively, or in addition, IVL may refer to a volumetric lighting model that computes global scattering and shadowing terms by propagating the illumination slice by slice.

Extending the light propagation technique from Cartesian to spherical slices may be denoted as spherical IVL. A generalized IVL may further include any interpolation, e.g., of the lighting space, between the conventional IVL using Cartesian slices and the inventive spherical IVL using spherical slices.

By the spherical IVL (and/or any generalized IVL), the rendered light volume may be updated at real-time, providing an improved spatial impression at lower computational cost (e.g., compared to conventional techniques) of the constructed and sampled light volume. Thereby, guidance of a medical practitioner during an interventional procedure may be improved at reduced computational cost and increased computational speed, leading to a less invasive and more favorable result of the interventional procedure.

The resolution of the light volume voxel grid may be comparable to, e.g., an irradiance cache voxel grid. The performance improvement of the inventive technique stems from the fact that only forward illumination scattering is performed, and the current type of slice-by-slice propagation may be implemented very efficiently on a GPU.

The resolution of IVL is related to the size of the structures it can resolve. E.g., resolving and/or providing a shadow for a one millimeter (1 mm) vessel structure requires a certain light volume resolution with IVL and a comparable resolution with irradiance caching; the latter, i.e., using irradiance caching, conventionally takes longer to compute.

In contrast to conventional IVL, one technique implements a single-pass lighting propagation using a lighting volume aligned to the lighting direction. Alternatively, or in addition, in contrast to conventional IVL, the technique supports interior spherical light sources (e.g., a point-like light source), and/or exterior spherical light sources, by performing the light propagation in a polar coordinate system.

In contrast to photon mapping techniques, the technique allows for high resolution light volume computations at real-time speeds. Alternatively, or in addition, while the lighting specification is not as flexible (e.g., support for spherical light sources and some deformations thereof is provided rather than generic volumetric light sources), the technique still allows for transillumination rendering applications.

At a given performance level, the technique disclosed herein allows for a higher resolution light volume, e.g., compared to irradiance caching.

The medical scanner may include a device from the group of an US device, a PET device, a CT device, and a MRT device.

The volumetric data from each of the devices may be classified in terms of a signal-to-noise ratio (SNR). E.g., US data may have a low SNR, and MRT data may have a high SNR.

Alternatively, or in addition, the SNR may depend on multiple factors related to the acquisition of the volumetric data by the medical scanner. The factors may include, e.g., a field strength and/or a scan time for MRT. Alternatively, or in addition, the factors may include, e.g., a source energy and/or radiation dose for CT.

The technique, which employs (e.g., gradient-free) shading, is suitable for higher performance rendering, in particular in real-time, of low SNR volumetric data than conventional gradient-based local shading techniques.

The act of rendering may include rendering the at least one medical image using a device from the group of a screen (which may also be denoted as, e.g., planar, display), a stereoscopic display, a virtual reality (VR) display, and/or an augmented reality (AR) headset.

The screen may be located in a room, e.g., where the medical scanner is located. E.g., the screen may include, or may be part of, a graphical user interface (GUI).

The stereoscopic display may provide and/or may improve a three-dimensional impression (also denoted as perception) of (e.g., anatomical) structures.

Any display on the VR display may be computer generated.

The VR display may include a VR headset. The VR headset may include a (e.g., monocular and/or binocular) head-mounted display (HMD) and/or an inertial measurement unit (IMU) measuring a human user's motions.

AR may refer to combining computer-generated display elements with real (e.g., directly visible by a human user and/or a camera) elements.

The AR headset may include a (e.g., monocular and/or binocular) head-mounted display (HMD) and/or an inertial measurement unit (IMU) measuring a human user's motions.

By rendering the at least one medical image using any one of the devices and/or units for rendering, a medical practitioner (also denoted as surgeon) may receive visual guidance during an interventional procedure. Alternatively, or in addition, by the rendering, additional acquisition of data may be enabled by a medical practitioner obtaining visual cues as to potential further regions of interest (ROIs) of (e.g., anatomical) structures in real-time.

The received volumetric data may be acquired, by the medical scanner, at a predetermined size of a time-step. The step of constructing the light volume may be performed for each time-step, and/or for each n-th time-step with n being a predetermined natural number.

A time-step may include the inverse of a frequency, which may be between 10 and 100 Hertz (Hz), e.g., 60 Hz. Alternatively, or in addition, the frequency may be set to a value such that a human (e.g., a medical practitioner) perceives a continuum of real-time images, e.g., in contrast to a discrete set of abruptly changing images.

Alternatively, or in addition, the received volumetric data may be acquired, by the medical scanner, at a predetermined size of a time-step. The act of constructing the light volume may include, at a time-step, and/or at each n-th time-step with n being a predetermined natural number, regenerating the light volume from a previous time-step. Regenerating the light volume may include using results from the previous time-step and re-constructing the light volume based on differences relative to the previous time-step.

By the regenerating of the light volume for each time-step, and/or at each n-th time-step with n being a predetermined natural number, rendering of a series of medical images based on the obtained volumetric data may be enabled in real-time.

Alternatively, or in addition, the light volume may be regenerated, e.g., instantaneously, when the following happens: the optical properties of the 3D volume change, e.g., on a new acquisition from the medical scanner, on a classification change, clipping, cropping, and/or any other operation that modifies the optical properties of the voxels; on light direction and/or position changes with respect to the volume data; and/or on other light property changes, e.g., including one or more changes in color, intensity, and/or spherical light source size.

Further alternatively, or in addition, the system (e.g., including the computing device) may enforce application specific limits, such as no more than N light volume re-computations per second with N a predetermined natural number.

The light volume does not necessarily need to be recomputed if none of the above events and/or changes have happened, but a fixed rate of light volume regeneration independent from the data acquisition rate may be preferable for three-dimensional (3D) and time data, such as in ultrasound as it could provide a more consistent framerate during lighting parameter changes.

The act of constructing the light volume may include a transformation from polar to Cartesian coordinates. Alternatively, or in addition, the act of sampling the constructed light volume may include an inverse transformation from Cartesian to polar coordinates.

Conventionally, for anatomical volumetric data a Cartesian grid is used to store (e.g., scalar) values obtained by the medical scanner, and volume rendering is performed in Cartesian space. Alternatively, or in addition, for anatomical volumetric data acquired via Ultrasound, non-Cartesian data is conventionally used.

The ultrasound data format may depend on an ultrasound transducer arrangement. Alternatively, or in addition, a probe-specific 'acoustic grid' may refer to when talking about the acquisition, e.g., with probe-specific scan conversion algorithms that convert the acoustic grid to a Cartesian grid for rendering. Some 3D probes may use linear girds, polar grids, and/or helical and/or twisted acoustic grids.

The data may be pre-scan and/or post-scan converted. Alternatively, or in addition, the scan conversion can be applied on demand during and/or for rendering. The present technique is compatible with both approaches.

When determining the shading for a given Cartesian position in the volumetric data, according to the inventive technique, the illumination from the polar grid light volume is determined (e.g., looked up from voxels of the volumetric data). Therefore, the Cartesian shading position may be transformed to the polar light volume position during shading.

Light propagation happens slice by slice, where each voxel may correspond to a position in a polar grid. During the act of constructing the light volume, the at least one optical property (e.g., an optical opacity) from the Cartesian anatomical volumetric data needs to be determined (e.g., looked up from voxels of the volumetric data) to determine how much of the light from the previous slice is occluded. Therefore, in the act of constructing the light volume, positions may be transformed from the polar coordinates of the light volume to the Cartesian coordinates of the anatomical volumetric data.

The act of sampling the light volume may include applying a two-dimensional and/or three-dimensional (e.g., reconstruction) filter. The (e.g., reconstruction) filter may include a Gaussian kernel.

The (e.g., reconstruction) filter may be used to sample a voxel grid of the light volume at arbitrary 3D locations. Alternatively, or in addition, a goal of its design may be to balance performance vs. aliasing and/or ringing, and/or other visual artifacts. A lower-resolution light volume with a higher quality filter (e.g., cubic filter) may be preferable to a higher resolution volume and/or a nearest neighbor filter. A filter selection need not be strongly related to the light volume resolution and/or the perception improvement.

Alternatively, or in addition, by applying the (e.g., reconstruction) filter, an improved perception of the at least one medical image rendered in real-time at low resolution may be facilitated.

Conventional volume visualization methods based on raycasting, which are still used in many current advanced visualization medical products, simulate only the emission and absorption of radiant energy along the primary viewing rays through the volumetric data. The emitted radiant energy at each point is absorbed, e.g., according to the Beer-Lambert law, along the ray to the observer location with absorption coefficients derived from the patient data. Renderers typically compute shading using only the standard local shading models at each point along the ray (e.g., the Blinn-Phong model), based on the local volume gradients (also denoted as local illumination). While fast, the conventional methods do not simulate the complex light scattering and extinction associated with photorealism (also denoted as global illumination).

(E.g., physically-based) Monte Carlo path tracing and/or ray tracing (also briefly path tracing and/or ray tracing) may be used to simulate light paths though volumetric data with multiple scattering events per path using a stochastic process. As more and more paths and/or rays are simulated, the solution converges on an accurate estimation of the irradiance at each point for incoming light from all directions. A renderer may employ a hybrid of volumetric scattering and surface-like scattering, modeled by phase functions and bidirectional reflectance distribution functions (BRDFs), respectively, based on properties derived from anatomical data, in particular the anatomical structures of the volumetric data.

Alternatively, or in addition, Monte Carlo path tracing may include a rendering technique that provides a more complete simulation of the light compared to any IVL technique, however, at the cost of increased computing time. Further alternatively, or in addition, Monte Carlo path tracing may be used to generate an irradiance cache. The irradiance cache may be conceptually similar to the light volume of any IVL technique, but conventionally requires more computational effort and/or memory than IVL techniques.

The (e.g., virtual) spherical light source may be non-static. Alternatively, or in addition, at least one property of the spherical light source may vary over time. The at least one property of the spherical light source may include a position, a size, a color, and/or an intensity of the spherical light source.

The one or more properties of the (e.g., virtual) spherical light source may vary as one or more properties, e.g., a perspective, of the received volumetric data vary.

The received volumetric data may be non-static. Alternatively, or in addition, the received volumetric data may vary over time.

The volumetric data may be obtained in real-time from the medical scanner during an interventional procedure. The variation of the volumetric data may include a change of perspective, and/or may stem from the functioning of a living (e.g., human) body and/or patient. E.g., during a cardiac cycle the cardiac ventricles may vary in size, and/or valves may be opened and closed.

Alternatively, or in addition, the variation of the received volumetric data may at least partially be due to a non-static medical scanner, e.g., a US device may be moved relative to a (e.g., human) body. The non-static medical scanner may alternatively, be denoted as moving camera.

The determined at least one optical property may be associated to at least one (e.g., anatomical) structure included in the volumetric data. Alternatively, or in addition, the at least one optical property may vary over the volume of the volumetric data, e.g., as one or more (e.g., anatomical) structures vary.

The at least one optical property may be selected from the group of an opacity, a reflectance, a color, and/or at least one value indicative of a chromatic scattering.

The color may be provided according to a red-green-blue (RGB) scheme (also denoted as RGB channel).

Alternatively, or in addition, the opacity may be provided according to a so-called alpha channel (also denoted as alpha scheme).

Further alternatively, or in addition, the opacity and the color may be combined according to a so-called RGB-alpha (RGBA) model (also denoted as RGBA channel or RGBA scheme).

The volumetric data may be mapped to the at least one optical property by a transfer function (TF).

The series of consecutive spherical slices may be ordered radially outward. Alternatively, or in addition, the spherical light source may include a point-like light source.

At least the act of constructing the light volume and/or the act of sampling the light volume may be performed by a graphics processing unit (GPU).

Up to now, the technique has been described with respect to the method. Features, advantages or alternative embodiments herein can be assigned to the other objects or aspects (e.g., the computing device and/or the system and/or the computer program product) and vice versa. In other words, the apparatus or device can be improved with features described in the context of the method and vice versa. In this case, the functional features of the method are embodied by structural units of the apparatus or device or system and vice versa, respectively. Generally, in computer science, a software implementation and a corresponding hardware implementation (e.g., as an embedded system) are equivalent. Thus, for example, a method act for "storing" data may be performed with a storage unit and respective instructions to write data into the storage. For the sake of avoiding redundancy, although the device may also be used in the alternative embodiments described with reference to the method, these embodiments are not explicitly described again for the device.

As to a second aspect, a computing device for real-time rendering of medical images from volumetric data obtained from a medical scanner is provided. The computing device includes a first interface configured for receiving volumetric data from the medical scanner. The computing device further includes a first processing unit (processor) configured for determining at least one optical property in relation to the received volumetric data. The computing device further includes a second processing unit (processor) configured for constructing a light volume associated to a spherical light source. The light volume includes a series of consecutive spherical slices through which light from the spherical light source propagates according to the consecutive order (e.g., outwards). Constructing the light volume includes determining a fraction of the light propagating from one spherical slice to a corresponding neighboring spherical slice according to the consecutive order (e.g., outwards). The propagating of the light depends on the determined at least one optical property in relation to the received volumetric data associated with the spherical slice.

The computing device further includes a third processing unit (processor) configured for sampling the constructed light volume. The sampling includes a (e.g., gradient-free) shading which depends on the determined at least one optical property in relation to the received volumetric data associated with the spherical slice.

The computing device still further includes a second interface configured for outputting for rendering, based on the sampled light volume, at least one medical image in relation to the received volumetric data.

Alternatively, or in addition, the computing device according to the second aspect may be configured to perform the method according to the method as described above. The computing device may be implemented in hardware and/or the method may be implemented in software. The computing device may be configured to perform all acts of the method and/or may include any one of the features, disclosed within the context of the first aspect (method).

As to a third aspect, a system for real-time rendering of medical images from volumetric data obtained from a medical scanner is provided. The system includes a medical scanner for providing volumetric data. The system further includes a computing device (computer) according to the second aspect. The first interface of the computing device is configured to receive the volumetric data from the medical scanner. The system still further includes a rendering unit (renderer or graphics processing unit) including an interface for receiving an output, from the second interface of the computing device, of at least one medical image in relation to the volumetric data from the computing device. The rendering unit is configured to render the at least one medical image.

As to a fourth aspect, a computer program product including program elements which induce a server (e.g., embodied by the computing device of the second aspect) to carry out the acts of the method for real-time rendering of medical images from volumetric data obtained from a medical scanner according to the first aspect, when the program elements are loaded into a memory of the server.

As to a fifth aspect, a non-transitory computer-readable medium on which program elements are stored that can be read and executed by a server (e.g., embodied by the computing device of the second aspect), in order to perform acts of the method for real-time rendering of medical images from volumetric data obtained from a medical scanner according to the first aspect, when the program elements are executed by the server.

The properties, features and advantages of this invention described above, as well as the manner they are achieved, become clearer and more understandable in the light of the following description and embodiments, which will be described in more detail in the context of the drawings. This following description does not limit the invention on the contained embodiments. Same components or parts can be labeled with the same reference signs in different figures. In general, the figures are not for scale.

It shall be understood that a preferred embodiment of the present invention can also be any combination of the dependent claims or above embodiments with the respective independent claim.

These and other aspects will be apparent from and elucidated with reference to the embodiments described hereinafter.

Any reference signs in the claims should not be construed as limiting the scope.

BRIEF DESCRIPTION OF THE DRAWINGS

FIG. 3A shows an example of a point-like light source with a series of consecutive slices of a light volume, where light propagates radially outwards;

FIGS. 3B, 3C and 3D show example deformations from a point-like light source towards a planar light source with spherical slices of a light volume being deformed to parabolic slices;

FIG. 3E shows an example essentially planar light source and example essentially planar slices of a light volume;

FIGS. 3F and 3G show example deformations from the essentially planar light source towards an exterior spherical light source with slices of the light volume being deformed from parabolic towards inwards ordered spherical;

FIG. 3H shows an example external spherical light source with spherical slices of a light volume, in which light propagates inwards to the center of the spherical light source;

DETAILED DESCRIPTION

Figure 1:
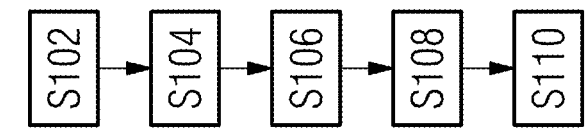
FIG. 1 is a flow chart of a method according to a preferred embodiment.

FIG. 1 shows an exemplary flowchart of a computer-implemented method 100 for real-time rendering of medical images from volumetric data obtained from a medical scanner.

The method 100 includes an act S102 of receiving volumetric data from the medical scanner.

The method 100 further includes an act S104 of determining at least one optical property in relation to the received S102 volumetric data.

The method 100 further includes an act S106 of constructing a light volume associated to a spherical light source. The light volume includes a series of consecutive spherical slices (e.g., ordered radially outwards from an internal and/or point-like light source) through which light from the spherical light source propagates according to the consecutive order. The act S106 of constructing the light volume includes determining a fraction of the light propagating from one spherical slice to a corresponding neighboring spherical slice according to the consecutive order. The propagating of the light depends on the determined S104 at least one optical property in relation to the received S102 volumetric data associated with the spherical slice.

The method 100 further includes an act S108 of sampling the constructed S106 light volume. The act S108 of sampling the light volume includes a (e.g., gradient-free) shading that depends on the determined S104 at least one optical property in relation to the received S102 volumetric data associated with the spherical slice.

The method 100 still further includes an act S110 of rendering at least one medical image in relation to the received S102 volumetric data. The act S110 of rendering is based on the sampled S108 light volume.

Figure 2:
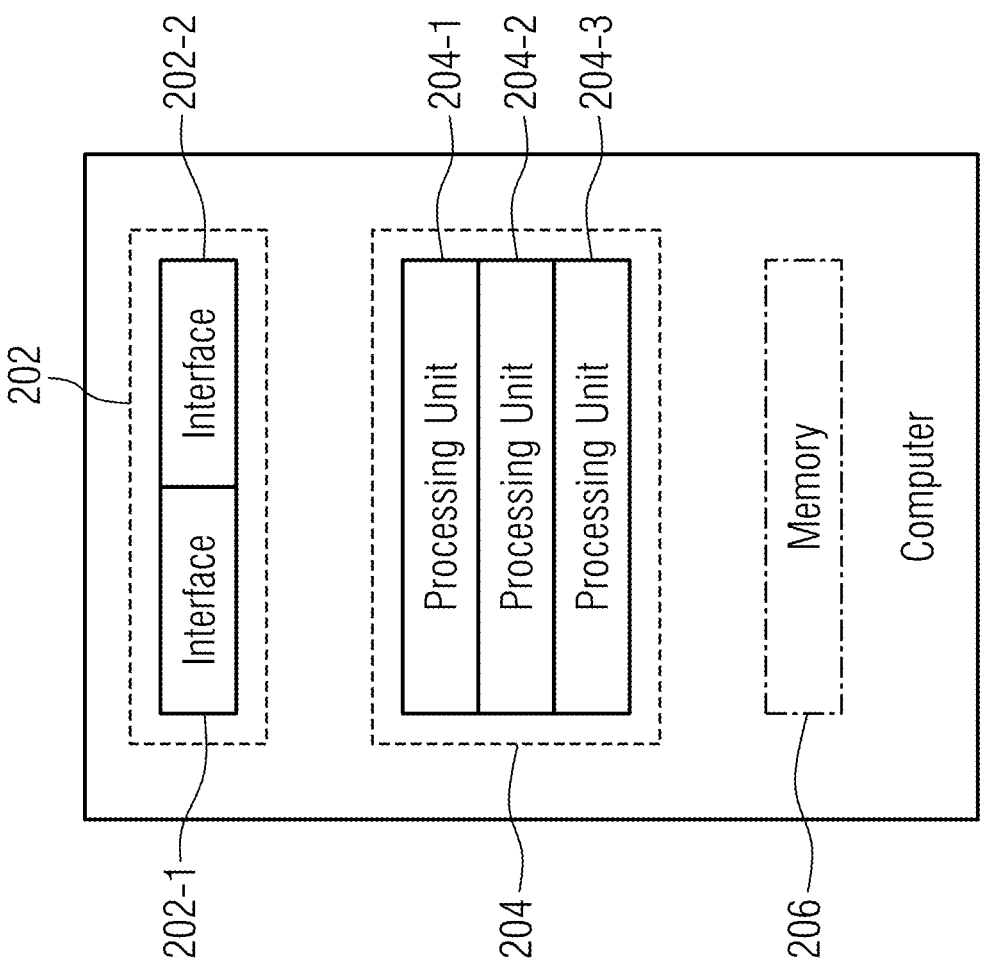
FIG. 2 is an overview of the structure and architecture of a computing device according to a preferred embodiment.

FIG. 2 shows an exemplary computing device (computer) 200 for real-time rendering of medical images from volumetric data obtained from a medical scanner.

The computing device 200 includes a first interface 202-1 configured for receiving volumetric data from the medical scanner.

The computing device 200 further includes a first processing unit (processor) 204-1 configured for determining at least one optical property in relation to the received volumetric data.

The computing device 200 further includes a second processing unit (processor) 204-2 configured for constructing a light volume associated to a spherical light source. The light volume includes a series of consecutive spherical slices through which light from the spherical light source propagates according to the consecutive order. Constructing the light volume includes determining a fraction of the light propagating from one spherical slice to a corresponding neighboring spherical slice according to the consecutive order (e.g., radially outwards). The propagating of the light depends on the determined at least one optical property in relation to the received volumetric data associated with the spherical slice.

The computing device 200 further includes a third processing unit (processor) 204-3 configured for sampling the constructed light volume. The sampling includes a (e.g., gradient-free) shading that depends on the determined at least one optical property in relation to the received volumetric data associated with the spherical slice.

The computing device 200 still further includes a second interface 202-2 configured for outputting for rendering, based on the sampled light volume, at least one medical image in relation to the received volumetric data.

The second interface 202-2 may be connected to an interface of a rendering unit (e.g., a screen in a room, and/or an AR headset).

Optionally, the computing device 200 includes a memory 206, e.g., for storing the received volumetric data, and/or for storing the constructed light volume, in particular according to a time-act.

The first interface 202-1 and the second interface 202-2 may be embodied by a combined interface 202 configured to perform the corresponding acts.

The first, second and third processing unit 204-1; 204-2; 204-3 may be embodied by a combined processing unit 204, e.g., by a CPU, configured to perform the corresponding acts. Alternatively, or in addition, any two of the processing units 204-1; 204-2; 204-3 may be combined into one processing unit configured to perform the corresponding acts.

The one or more processing units 204; 204-1; 204-2; 204-3 may be a combination of one or more of a microprocessor, controller, microcontroller, central processing unit (CPU), digital signal processor, application specific integrated circuit, field programmable gate array, graphics processing unit (GPU), or any other suitable computing device, resource, or combination of hardware, microcode and/or encoded logic operable to provide, either alone or in conjunction with other components of the device 200, such as the interfaces 202-1; 202-2 and the optional memory 206, volumetric data and/or graphics processing functionality. For example, the one or more processors 204; 204-1; 204-2; 204-3; 204-4 may execute instructions stored in the memory 206. Such functionality may include providing various features and acts discussed herein, including any of the benefits disclosed herein. The expression "the device being operative to perform an action" may denote the device 200 being configured to perform the action.

As schematically illustrated in FIG. 2, the device 200 may be embodied by a computer, in particular a workstation, including a GPU.

The first interface 202-1, the first, second and third processing units 2041; 204-2; 204-3, and the second interface 202-1 may be configured to perform the method acts S102, S104, S106, S108 and S110, respectively.

The method 100, e.g., when performed by the computing device 200, enables real-time approximated global illumination for volume rendering, where a spherical light source geometry (in particular including a point-like light source) is implemented with a simple transformation of the lighting space (also denoted as light volume or illumination volume).

Alternatively, or in addition, the method 100, e.g., when performed by the computing device 200, extends the conventional Interactive Volumetric Lighting (IVL) technique with support for curved area light sources and movable internal spherical light sources at comparable rendering speeds. As for conventional IVL with an external point-like light source, real-time rendering with hard and/or soft shadows is supported as well as forward light scattering, while the light volume re-generations (e.g., re-computations) can be performed at interactive to real-time rates.

The technique specifically targets real-time transillumination volume rendering for virtual and/or augmented reality (VR and/or AR) clinical support and education, four-dimensional (4D) ultrasound, as well as general volume lighting.

Herein, 4D may refer to three space-dimensions with changes in the volumetric data over time as the fourth dimension, e.g., according to predetermined time-acts.

Since only the coordinate system for the light propagation is modified compared to the conventional IVL with an external point-like light source, the implementation over the existing IVL code is straightforward and does not require the creation of new clinical presets.

Alternatively, or in addition, the inventive technique is backwards compatible with conventional rendering techniques.

In the following, an exemplary system is described.

The exemplary system includes the following components. A so-called "Volume Loader", e.g., embodying the first processing unit 204-1 of the computing device 200, provides an evaluator for, e.g., a volumetric optical opacity as the at least one optical property in relation to the volumetric data for the received volumetric data (also denoted as the loaded 3D volume), based on a look-up table (LUT), or another type of classification.

The so-called "Light Volume Generator", e.g., embodying the second processing unit 204-2 of the computing device 200, uses an evaluator of, e.g., the volumetric opacity as the at least one optical property, and a light description to construct the light volume in a first pass.

The so-called "Volume Renderer", e.g., embodying the third processing unit 204-3 of the computing device 200, samples the light volume during rendering to compute global illumination effects in a second pass.

In the original and/or conventional IVL, the light volume is always aligned to the anatomical volume. For a given light direction, the illumination is then propagated along the two axes of the volume coordinate system that are closest to the light direction.

In contrast, the light volume, as described herein, for exterior light sources is always aligned to the light direction. A disadvantage may be that a higher resolution of the light volume might be needed when the light direction is not along any one of the X, Y or Z axes, but the illumination is propagated along a single axis only.

For interior spherical light sources, the light volume, as described herein, is aligned to the anatomy volume, and the propagation also happens along a single axis in the polar coordinate system.

The so-called "Display and interaction system" triggers light volume re-generation when the volumetric optical opacity is changed (e.g., the classification or windowing changes), or when the lighting relative to the volume changes. The "Display and interaction system" may be embodied by the first processing unit 204-1, and/or may be part of a combined processing unit 204.

While the constructed and/or sampled light volume can be used with any volume rendering algorithm, a preferred embodiment for this invention uses GPU-based single-pass raycasting, where the light volume is used to approximate the shadowing for the direct illumination (e.g., term) and the indirect illumination (e.g., term).

In one embodiment, the light volume is used with raycasting during interaction with the system, while Monte Carlo path tracing is used to compute the final image progressively.

The system may use different rendering algorithms during interaction, e.g., raycasting while the user changes camera and/or light parameters, and/or progressively refining Monte Carlo path tracing during non-interaction times.

The present technique allows for approximate global illumination during user interaction in transillumination scenarios (e.g., using interior light sources) that can be computed (and/or determine) in real time even during lighting and classification changes. Compared to conventional methods, it is faster to compute than irradiance caching methods, and provides improved image perception compared to raycasting with local shading.

Figure 4A:
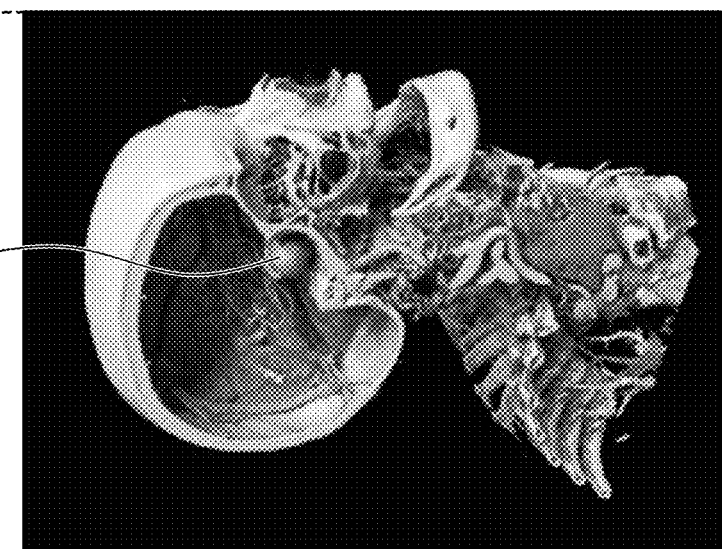
FIGS. 4A, 4B and 4C show an example comparison of conventional techniques for rendering with an external directional light source in FIGS. 4A and 4C and IVL as described herein in FIG. 4B.
Figure 4B:
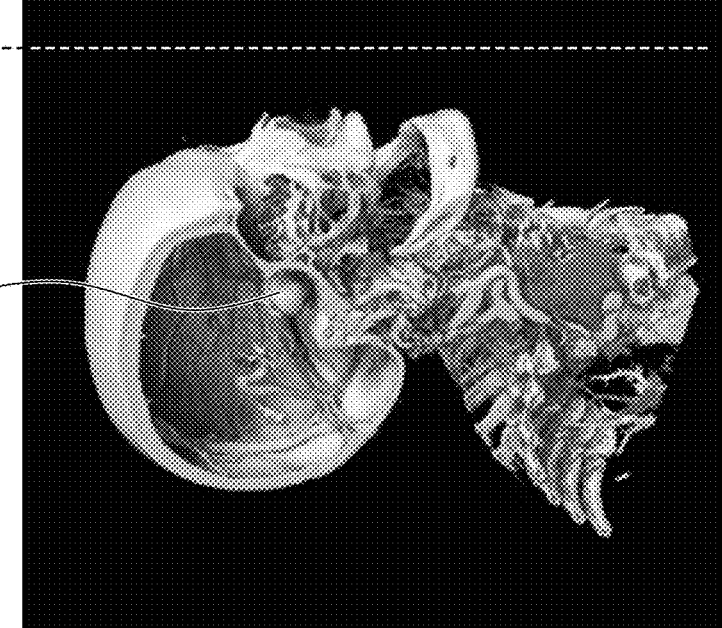
Figure 4C:
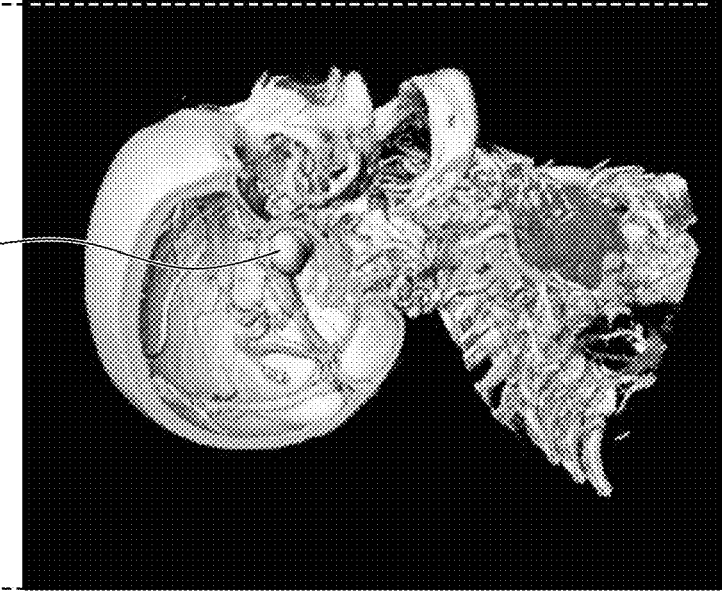
Figure 5C:
FIGS. 5A, 5B and 5C show a comparison of conventional techniques for rendering with an internal spherical light source in FIGS. 5A and 5C and the spherical IVL in FIG. 5B.
Figure 5B:

As FIGS. 4B and 4C as well as FIGS. 5B and 5C show, the IVL result is often closer to the final Monte Carlo path traced image than local illumination rendering, which improves the image consistency when the algorithms are changed at runtime. By contrast, raycasting and ambient occlusions only are used, which does not account for shadowing and produces interactive images that are less consistent with the final rendering.

In one embodiment, the volumetric data includes a 4D volumetric sequence, e.g., from ultrasound or PET acquisition. A single light volume may be used, where time-act changes modify, e.g., the optical opacity as the at least one optical property in the evaluator (e.g., embodying the first processing unit 204-1 of the computing device 200) and therefore trigger a re-generation of the light volume. Alternatively, or in addition, a separate light volume may be kept for each time-act of the 4D volume, allowing continuous camera changes (e.g., for VR with head tracking) to be rendered together with time-act changes (e.g., a continuous playback of 4D ultrasound) without re-generating the light volume.

In one embodiment, IVL is used to compute the light volume slice by slice on a graphics processing unit (GPU). The light volume may correspond to a Cartesian grid, and the light propagation is performed slice-by-slice in order to leverage the GPU's built-in texturing support. FIG. 3E illustrates a view with an essentially planar light source 302-5 on the right, and light propagating to the left along essentially planar slices 304-5A; 304-5B.

In the following, light space transformations extending the conventional IVL algorithm with an external point-like light source are described. The medical images may be obtained at real-time rates, based on the constructed and sampled light volume, for the sampling and/or rendering (e.g., at 60 Hertz, Hz, or higher) and interactive rates during light volume re-construction (also denoted as re-calculation, e.g., at 20 Hz, or higher). The constructing frequency and/or the sampling frequency may depend on the resolution of the light volume.

The conventional implementation of IVL into the technique as described herein uses a Cartesian light volume whose z-axis is aligned to the direction of an exterior directional light source, and the light volume encompasses an anatomy volume of the volumetric data. The light propagation is computed slice by slice, where for each voxel position on the current slice, the illumination at the corresponding voxel on the previous slice is determined (or fetched), and the illumination at the current slice is attenuated by, e.g., the volume opacity as an example of the at least one optical property. A Gaussian kernel, and/or similar filtered sampling, may be used to approximate forward light scattering and soft shadows. Different kernel sizes and/or filter sizes may be used for the chromatic scattering and for the shadow propagation.

Whenever a filter is applied in the figures, three samples for Gaussian filtering of the previous slice are applied.

Alternatively, or in addition, the "conventional" implementation of IVL may refer to the exterior directional light source IVL. The implementation for that light source in the inventive system may use a single-pass propagation along the z-axis of the light volume, which is then unified with interior light source handling in polar space (e.g., both use a single pass propagation along the light volume z-axis according to the inventive technique).

In one embodiment, the light volume may be represented by a polar grid. Fast slice-by-slice update is performed on the GPU, with consecutive slices 304-1A; 304-1B now described by concentric spheres in the 3D volume space. Since the z-axis of the light volume space is mapped to the polar radius axis in volume space, the light propagation in the context of the volumetric data is performed from a single point outward, which approximates an internal point-light source 302-1 as shown in FIG. 3A.

FIG. 4B and FIG. 5B show rendering results with a moving internal point light source 302-1. In contrast, the conventional IVL algorithm supports external point light sources only by projecting the light onto the boundary of the light volume slices.

The position of the point-light source 302-1 according to this technique may be specified by translating the origin of the light volume with respect to the volumetric data.

The polar to Cartesian transformation is used during the act S106 of constructing of the light volume, when sampling, e.g., the volumetric optical opacity as the at least one optical property in the scene. During the act S108 of sampling for rendering, the inverse transformation (i.e., Cartesian to polar) is used to sample the light volume.

In an embodiment, the z-axis mapping to the polar space radius uses an offset, which effectively approximates a spherical light source. FIG. 3A shows the point-like light source 302-1, and FIGS. 3B, 3C and 3D show deformations with asymmetrical light sources 302-2; 302-3; 302-4, in which spherical slices 304-2A; 304-2B effectively transmute to parabolic slices 304-3A; 304-3B and 304-4A; 304-4B.

The offset may be part of the light space definition and may be used in the polar to Cartesian and/or Cartesian to polar coordinate conversions. The offset may equal the radius of the spherical light source.

In one embodiment, the z-axis is mapped to 1-r (with r being the conventional radius) in polar coordinates, in which case the light propagation is performed inwards toward the origin of the light volume, as shown for the spherical light source 302-8 with spherical slices 304-8A; 304-8B in FIG. 3H.

The external spherical light source 302-8 in FIG. 3H approximates an environmental light source. However, it will not produce correct hard shadows in concave regions of the volumetric data. A larger blur kernel is required when light is propagated to adjacent slices 304-8A; 304-8B.

In an embodiment, a composite light space transformation is used.

FIGS. 3B to 3G show examples, in which the polar and Cartesian transformations are linearly interpolated to produce a smooth blending between the inventive point-light source 302-1 of FIG. 3A, area light sources, in particular 302-4; 302-5; 302-6 of FIGS. 3D, 3E, 3F including an essentially planar directional light source 302-5 in FIG. 3E, and environmental light sources 302-7; 302-8 in FIGS. 3G and 3H.

In all cases, the light propagation in the light volume space is performed slice by slice from slice 304-XA to slice 304-XB with X=1, . . . , 8. This type of light propagation maps efficiently to the GPU architecture.

A practical implementation may use the transformation in FIG. 3E for exterior light sources 302-5, and/or the current transformation of FIG. 3A for interior light sources 302-1, and apply a smooth transition for light positions near the boundary of the volumetric data.

Point light sources outside the anatomical volume may use the directional and/or planar light space definition shown in FIG. 3E. Alternatively, or in addition, points within the anatomical volume may use the point/sphere definition in FIG. 3A. Within a distance range of the boundary. The two coordinate transformations may be interpolated so that the light source type blends smoothly (and/or a smooth transition is applied) between the directional and the point light types.

The transitions from FIG. 3A to FIG. 3H may be denoted as different degrees of curving the light propagation space.

The light volume is sampled for the rendering to obtain the direct illumination shadowing (e.g., term) and the indirect illumination (e.g., term). The sampling may use any, in particular reconstruction, filter, such as the native texture filtering of the GPU, or a higher-order reconstruction filter. Separate filtering and/or heuristics may be applied to reduce aliasing artifacts as well.

In a preferred embodiment, the sampling position of the light volume is adaptively offset along the volumetric data gradient to reduce artifacts due to self-occlusion of surface-like structures.

In a further preferred embodiment, a real-time 2D Gaussian kernel is applied during light volume sampling with N stratified samples (with N a natural number) on a disc aligned to the propagation direction of the current light volume position. The disc is rotated randomly for each invocation of the Gaussian kernel.

A typical configuration may use between three (3) to eight (8) samples depending on the performance requirements. In particular, three samples may be used in the accompanying drawings.

In a still further preferred embodiment, a 3D Gaussian kernel may be used with samples contained in a sphere rather than a disc. The filtering may also be performed in the coordinate system of the light volume, accounting for the curvature of the light volume space.

FIGS. 4A and 4C compare the results for an external (also: exterior) directional light source according to conventional techniques with the technique described herein in FIG. 4B. Each medical image is generated from the same volumetric data including a human skull with an aneurysm 402.

FIG. 4A shows a medical image from volumetric data, in which conventional raycasting with local illumination only is applied. FIG. 4B uses the light space from FIG. 3E, i.e., IVL with light propagation using the corresponding propagation space, to generate a medical image from the same volumetric data as in FIG. 4A. FIG. 4C uses the same volumetric data as in FIGS. 4A and 4B and conventional offline Monta Carlo path tracing to generate a medical image.

While the medical image in FIG. 4B with real-time lighting lacks some of the complex light interactions in the Monte Carlo volumetric path tracing solution of FIG. 4C, the overall spatial impression is improved significantly compared to the local illumination of FIG. 4A, which uses only raycasting. The improved spatial impression in FIG. 4B is achieved at a fraction of the computational cost (e.g., including computational time) of the conventional technique of FIG. 4C.

Figure 5A:
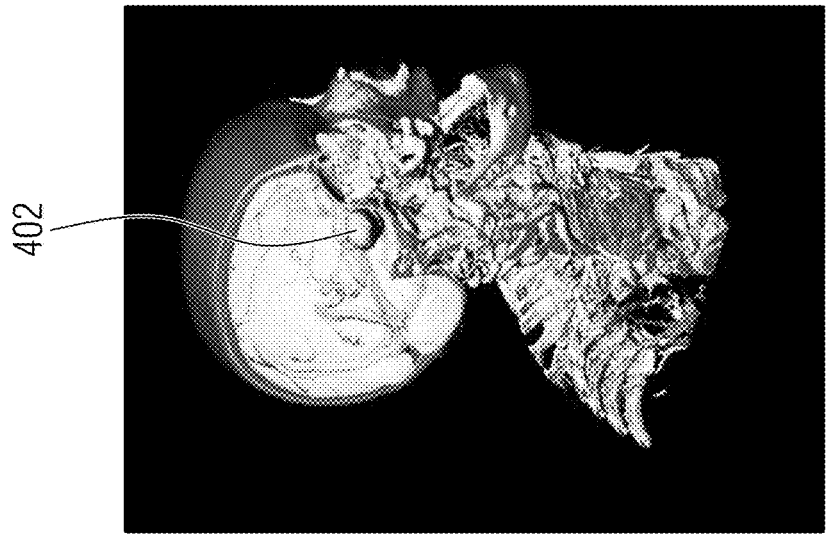

FIGS. 5A and 5C compare the results for an internal (also: interior) spherical light source according to conventional techniques with the technique described herein in FIG. 5B. FIGS. 5A, 5B and 5C use the same volumetric data of a human skull with an aneurysm 402 as in FIGS. 4A, 4B and 4C. The spherical light source in FIGS. 5A, 5B and 5C is placed near the aneurysm 402.

FIG. 5A shows a medical image using conventional raycasting with local illumination only. FIG. 5B shows a medical image using the spherical IVL with light propagation from a point-like light source using the propagation space of FIG. 3A. FIG. 5C shows a medical image using conventional offline Monte Carlo path tracing.

The real-time lighting of FIG. 5B uses the light space transform from FIG. 3A. An exemplary implementation of the technique produces images of the type in FIG. 5A at the rates of 32 Hz for the local illumination raycasting, and for the images of the type in FIG. 5B at 27 Hz with static real-time lighting and at 15 Hz with dynamic real-time lighting, where the light volume is recomputed at each frame.

Figure 6C:
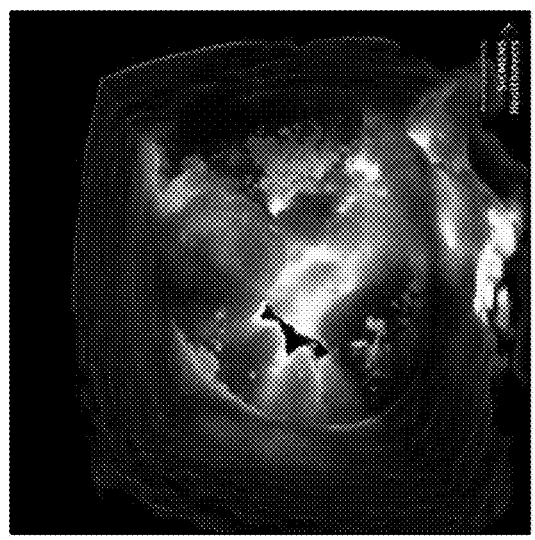
FIGS. 6A, 6B and 6C show an example of transillumination volume rendering for 4D ultrasound data, where a spherical light source is placed behind a heart valve.
Figure 6B:
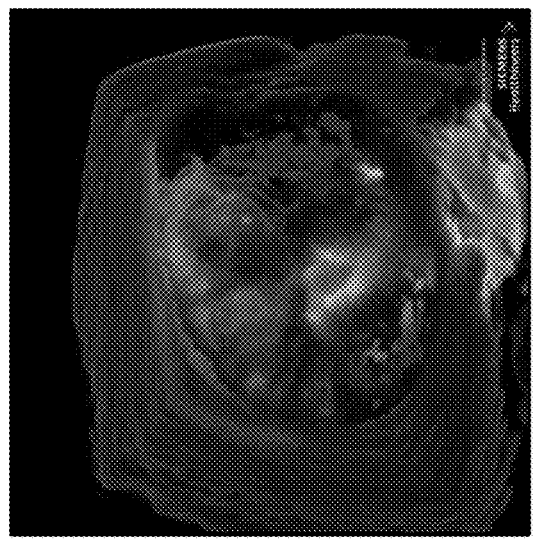
Figure 6A:
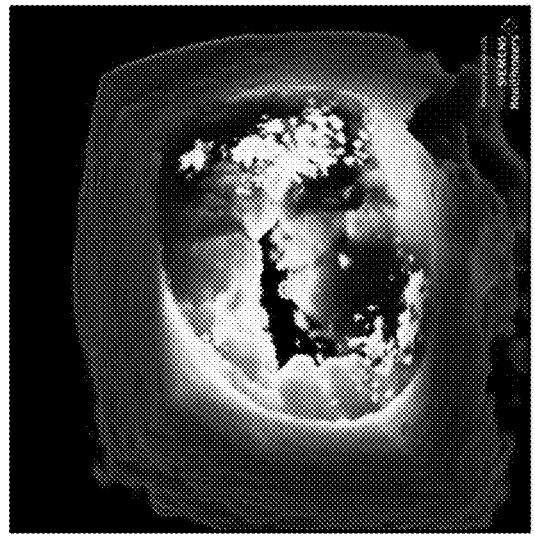

FIGS. 6A, 6B and 6C show an example of transillumination volume rendering at real-time for 4D ultrasound data, where a spherical light source is placed behind a heart valve. The illumination may be used to judge tissue densities. The frames in FIGS. 6A, 6B and 6C are from an interactive session that includes cine playback and a moving light source. E.g., FIGS. 6A, 6B and 6C can be viewed as medical images during different times within a cardiac cycle.

Figure 7:
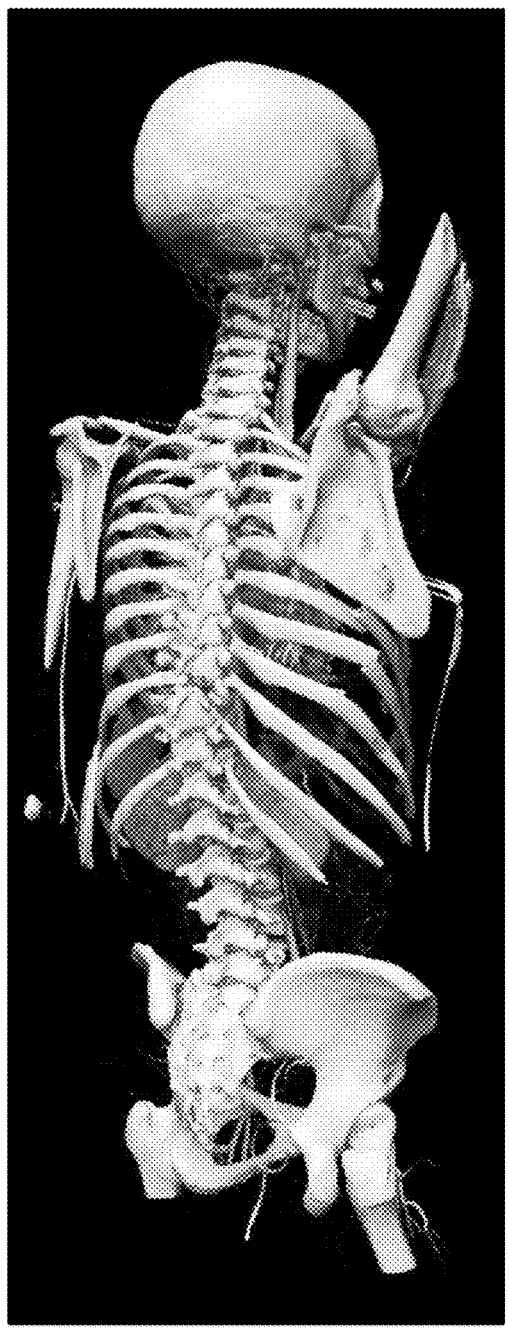
FIG. 7 shows an example of exterior illumination according to the technique described herein.
Figure 9:
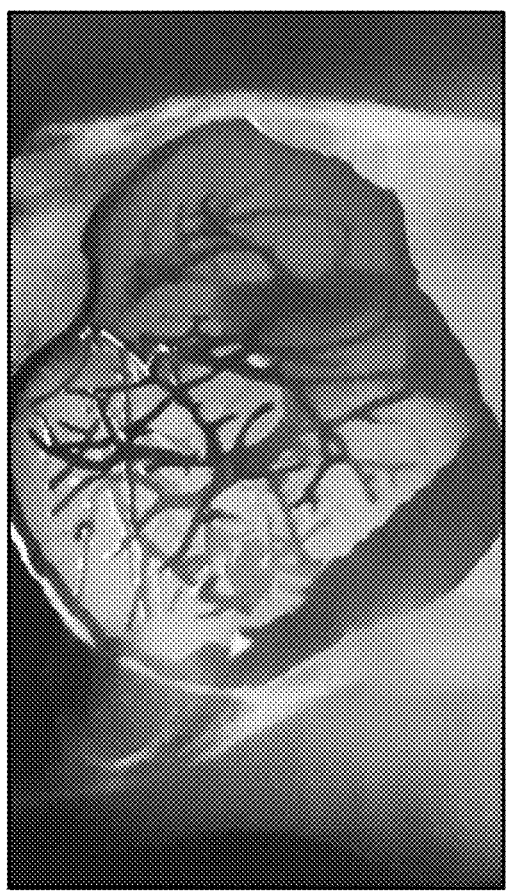
FIG. 9 shows an example of transillumination in 4D ultrasound for head-tracked AR liver surgery support.
Figure 8:
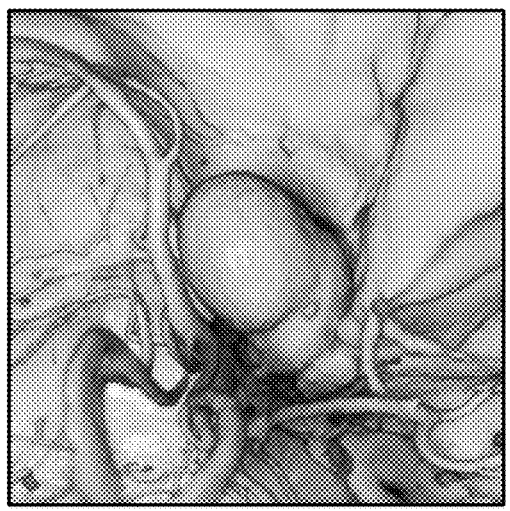
FIG. 8 shows an example of interior endoscopic illumination.

Further exemplary applications of the real-time rendering technique are described herein are shown in FIGS. 7, 8 and 9.

FIG. 7 shows an example of an exterior illumination of a human skeleton using the light volume of FIG. 3E.

FIG. 8 shows an interior endoscopic illumination, where the interior spherical lighting is used with simulated endoscopic views of pre-op CT data at real-time speeds. FIG. 8 shows the same aneurysm and the same data referenced in FIGS. 4 and 5. In FIG. 8, both the light source and the camera are placed near the aneurysm, inside the volume data. By contrast, in FIG. 5, the light source is interior, but the camera is exterior to the volume data.

FIG. 9 shows a head-tracked AR liver for surgery support. Such visualizations target AR and surgery support procedures. The medical image in FIG. 9 is captured during AR rendering on a stereoscopic display with head tracking. The light source is placed behind the liver and illuminates segmented structures in the volumetric data.

A suggested phantom for detecting the presence of the technique described herein in a rendered image includes large flat surfaces, e.g., similar to the skull in FIG. 5B. For detection, ideally both concave and convex surfaces are present.

The computing device 200 (also denoted as the renderer) may support some combination of point, sphere, directional and ambient light sources, both interior and exterior.

Both shadowing and glow through the tissue may be supported. For point-like and spherical light sources according to the technique, the shadow resolution decreases away from the light source location, whereas some of the conventional techniques, such as photon mapping, do not exhibit an increase of the effective resolution near the light source.

It may be possible to observe evidence of the slice-based nature of the computation described herein when examining large flat surfaces which are lit directly, as well as the penumbra of the shadows. Depending on the effectiveness of the mitigation techniques, a subtle banding or a 'woodgrain' artifact may be observed, especially when the technique is tuned for high framerate rendering (e.g., lower light volume resolution, simpler filtering). The alignment may be similar to the layers shown in FIG. 3A or 3H.

Wherever not already described explicitly, individual embodiments, or their individual aspects and features, described in relation to the drawings can be combined or exchanged with one another without limiting or widening the scope of the described invention, whenever such a combination or exchange is meaningful and in the sense of this invention. Advantages which are described with respect to a particular embodiment of the present invention or with respect to a particular figure are, wherever applicable, also advantages of other embodiments of the present invention.

The invention claimed is:

1. A computer-implemented method for real-time rendering of medical images from volumetric data obtained from a medical scanner, the method comprising:
   receiving volumetric data from the medical scanner;
   determining at least one optical property in relation to the received volumetric data;
   constructing, prior to rendering a medical image, a light volume in its entirety associated to a spherical light source, wherein the light volume comprises a grid of voxels representing a series of consecutive spherical slices through which light from the spherical light source propagates according to a consecutive order, wherein the light volume stores values for an amount of light that reaches each voxel in the grid of voxels, wherein constructing the light volume comprises determining a fraction of the light propagating from a spherical slice of the series of consecutive spherical slices to a corresponding neighboring spherical slice of the series of consecutive spherical slices according to the consecutive order, and wherein the propagating of the light depends on the determined at least one optical property in relation to the received volumetric data associated with the spherical slice; and
   rendering, in real time, the medical image in relation to the received volumetric data from a view point that is apart from the spherical light source, wherein rendering is based on sampling the constructed light volume, wherein the sampling comprises a gradient-free shading that depends on the determined at least one optical property in relation to the received volumetric data associated with the spherical slice.

2. The computer-implemented method of claim 1, wherein the medical scanner comprises a device from the group of: an ultrasound device; a positron emission tomography device; a computed tomography device; and a magnetic resonance tomography device.

3. The computer-implemented method of claim 1, wherein rendering comprises rendering the medical image using a device from the group of: a screen; a stereoscopic display; a virtual reality display; and an augmented reality headset.

4. The computer-implemented method of claim 1, wherein the received volumetric data are acquired, by the medical scanner, at a predetermined size of a time-step, and wherein constructing the light volume is performed for each time-step.

5. The computer-implemented method of claim 1, wherein the received volumetric data are acquired, by the medical scanner, at a predetermined size of a time-step, and wherein constructing the light volume comprises, at one time-step, re-generating the light volume from a previous time-step.

6. The computer-implemented method of claim 1, wherein constructing the light volume comprises transforming from polar to Cartesian coordinates, and wherein sampling the constructed light volume comprises inversely transforming from Cartesian to polar coordinates.

7. The computer-implemented method of claim 1, wherein sampling the light volume comprises applying a two-dimensional and/or three-dimensional reconstruction filter.

8. The computer-implemented method of claim 7, wherein the reconstruction filter comprises a Gaussian kernel.

9. The computer-implemented method of claim 1, wherein the spherical light source is non-static and/or wherein at least one property of the spherical light source varies over time, wherein the at least one property of the spherical light source comprises a position, a size, a color, and/or an intensity.

10. The computer-implemented method of claim 1, wherein the received volumetric data are non-static and/or vary over time.

11. The computer-implemented method of claim 1, wherein the determined at least one optical property is associated to at least one structure comprised in the volumetric data, and wherein the at least one optical property is selected from the group of: an opacity; a reflectance; a color; and at least one value indicative of a chromatic scattering.

12. The computer-implemented method of claim 1, wherein the series of consecutive spherical slices is ordered radially outward and/or wherein the spherical light source comprises a point-like light source.

13. The computer-implemented method of claim 1, wherein constructing and/or sampling the light volume is performed by a graphics processing unit.

14. A system for real-time rendering of medical images from volumetric data obtained from a medical scanner, the system comprising:
 a first interface configured for receiving volumetric data from the medical scanner;
 a first processor configured for determining at least one optical property in relation to the received volumetric data;
 a second processor configured for constructing a light volume associated to a spherical light source, wherein the light volume comprises a grid of voxels representing a series of consecutive spherical slices through which light from the spherical light source propagates according to a consecutive order, wherein constructing the light volume comprises determining a fraction of the light propagating from a spherical slice of the series of consecutive spherical slices to a corresponding neighboring spherical slice of the series of consecutive spherical slices according to the consecutive order, wherein the light volume stores a value for an amount of light that reaches each voxel in the grid of voxels and wherein the propagating of the light depends on the determined at least one optical property in relation to the received volumetric data associated with the spherical slice;
 a third processor configured for rendering a medical image in relation to the received volumetric data from a view point that is apart from the spherical light source, wherein rendering is based on sampling the constructed light volume, wherein the sampling comprises a gradient-free shading that depends on the determined at least one optical property in relation to the received volumetric data associated with the spherical slice; and
 a second interface configured for outputting the medical image.

15. The system of claim 14, wherein the medical scanner comprises an ultrasound device, a positron emission tomography device, a computed tomography device, or a magnetic resonance tomography device; wherein the second interface outputs to a screen, a stereoscopic display, a virtual reality display, or an augmented reality headset; and wherein the second and/or third processor comprises a graphics processing unit.

16. The system of claim 14, wherein the first interface is configured to receive the volumetric data at a predetermined size of a time-step, and wherein the second processor is configured to construct the light volume for each time-step or, at one time-step, re-generate the light volume from a previous time-step.

17. The system of claim 14 wherein the second processor is configured to construct the light volume as a transformation from polar to Cartesian coordinates, and wherein the third processor is configured to sample the constructed light volume by inversely transformation from the Cartesian coordinates to the polar coordinates.

18. The system of claim 14, wherein the received volumetric data are non-static and/or vary over time, wherein the spherical light source is non-static and/or wherein at least one property of the spherical light source varies over time, the at least one property of the spherical light source comprising a position, a size, a color, and/or an intensity.

19. The system of claim 14, wherein the determined at least one optical property is associated to at least one structure comprised in the volumetric data, wherein the at least one optical property is selected from the group of: an opacity; a reflectance; a color; and at least one value indicative of a chromatic scattering, and wherein the series of consecutive spherical slices is ordered radially outward and/or wherein the spherical light source comprises a point-like light source.

20. A non-transitory computer-readable medium on which instructions are stored that can executed by a processor, the instructions comprising:
 determining at least one optical property in relation to received volumetric data from a medical scanner;
 constructing a light volume associated to a spherical light source, wherein the light volume comprises a grid of voxels representing a series of consecutive spherical slices through which light from the spherical light source propagates according to a consecutive order, wherein constructing the light volume comprises determining a fraction of the light propagating from a spherical slice of the series of consecutive spherical slices to a corresponding neighboring spherical slice of the series of consecutive spherical slices according to the consecutive order, wherein the light volume stores a value for an amount of light that reaches each voxel in the grid of voxels, and wherein the propagating of the light depends on the determined at least one optical property in relation to the received volumetric data associated with the spherical slice; and rendering a medical image in relation to the received volumetric data from a view point that is apart from the spherical light source, wherein rendering is based on sampling the constructed light volume, wherein the sampling comprises a gradient-free shading that depends on the determined at least one optical property in relation to the received volumetric data associated with the spherical slice.

\* \* \* \* \*